United States Patent
Van Den Dool

(10) Patent No.: US 7,475,512 B2
(45) Date of Patent: Jan. 13, 2009

(54) METHOD, GREENHOUSE AND AN INSTALLATION FOR ILLUMINATING PLANTS

(75) Inventor: Teunis Cornelis Van Den Dool, Monster (NL)

(73) Assignee: Hortilux Schreder B.V., Monster (NL)

( * ) Notice: Subject to any disclaimer, the term of this patent is extended or adjusted under 35 U.S.C. 154(b) by 354 days.

(21) Appl. No.: 11/189,335

(22) Filed: Jul. 26, 2005

(65) Prior Publication Data

US 2006/0032115 A1   Feb. 16, 2006

(30) Foreign Application Priority Data

Jul. 26, 2004   (NL) .................................. 1026725

(51) Int. Cl.
*A01G 9/00* (2006.01)
(52) U.S. Cl. ......................................................... 47/17
(58) Field of Classification Search ...................... 47/17, 47/1.01 R, 58.1 R
See application file for complete search history.

(56) References Cited

U.S. PATENT DOCUMENTS

| | | | | |
|---|---|---|---|---|
| 932,947 A * | 8/1909 | Barr | ........................... | 431/227 |
| 1,484,454 A * | 2/1924 | Shoenberg | ................ | 126/85 R |
| D195,878 S * | 8/1963 | Zimmerman | ............... | D23/328 |
| D233,342 S * | 10/1974 | Court | ........................ | D23/328 |
| 4,091,566 A * | 5/1978 | Horvath et al. | ................. | 47/17 |
| 4,198,953 A * | 4/1980 | Power | ........................ | 126/617 |
| D266,578 S * | 10/1982 | Moshier | .................... | D23/328 |
| 5,065,294 A * | 11/1991 | Poot, Jr. | ..................... | 362/346 |
| 5,261,928 A * | 11/1993 | DeMerritt et al. | .............. | 47/17 |
| 6,312,139 B1 * | 11/2001 | Baker et al. | ................. | 362/145 |
| 6,481,190 B2 * | 11/2002 | Van Zanten et al. | ............. | 56/1 |
| 2005/0005529 A1 * | 1/2005 | Brault et al. | ................... | 52/63 |
| 2006/0032115 A1 * | 2/2006 | Van Den Dool | ................ | 47/17 |

* cited by examiner

*Primary Examiner*—Francis T Palo
(74) *Attorney, Agent, or Firm*—K&L Gates LLP

(57) ABSTRACT

The present invention relates to a method for illuminating plants in a greenhouse, comprising the provision of a lamp above the plants, with adjustment of the distance between the lamp and the tip of the plants growing upwards to the height of the growing plants, this distance being kept between 80 cm and 240 cm. The present invention furthermore relates to a greenhouse, containing plants and an installation for illuminating plants, wherein the installation comprises a lamp, lifting gear for moving the lamp in the height direction relative to the plants and control means for measuring and/or setting the distance between the lamp and the tip of the plants growing upwards, and also relates to an installation for illuminating plants intended for use in such a greenhouse.

11 Claims, 2 Drawing Sheets

METHOD, GREENHOUSE AND AN INSTALLATION FOR ILLUMINATING PLANTS

BACKGROUND OF THE INVENTION

Field of the Invention

The present invention relates to a method for illuminating plants in a greenhouse, comprising the provision of a lamp above the plants, with adjustment of the distance (L) between the lamp and the tip of the plants growing upwards to the height of the growing plants, this distance being kept between 80 cm and 240 cm, as well as heating of the greenhouse by means of a heat source, such as a heating tube.

A method of this type disclosed in JP 07050929A and JP 2001069853A. Lighting of adjustable height is described in both publications. In these publications there is always a separate, particularly complex installation for moving the lighting in the desired manner. Both embodiments are, in particular, conceived for chambers where the are plants and there is no daylight.

The aim of the present invention is to provide a method that can be used in greenhouses where it is extremely important that daylight is let in.

Said aim is achieved with a method as described above in that the heat source is provided between the plants and is moved upwards as the plants grow and in that said lamp moves together with said heat source.

Lamps emit radiation of a specific light spectrum. In addition to visible light, this spectrum also comprises radiant heat, such as infra-red radiation. In the case of the lamps used in a greenhouse it is known that a relatively large proportion of the radiant energy consists of radiant heat. A significant proportion of this radiant heat is lost as a result of absorption, because a large proportion of the radiant heat is absorbed in the space between the lamp and the plants, for example by the moisture in the greenhouse.

This means that by providing the lamps at a constant, relatively small distance above the plants, or at least a distance that is small compared with the customary distances, less radiant heat will be lost and the upper part of the plants will be heated by the lamps.

SUMMARY OF THE INVENTION

The method according to the invention comprises heating the greenhouse by means of a heat source, wherein the heat source is provided between the plants and is moved upwards as the plants grow. The advantage of this arrangement is that in addition to the lamps there is a supplementary source for heating the plants, so that there are more options for setting heat management for the plants. With is arrangement moving the heat source upwards as the plants grow is necessary for as uniform as possible a heat transfer to the growing top of the plants in the course of time.

It is known that the heat management in the top region of plants, the part where the growth of a plant takes place, is a very important parameter for the growth of the plants. For this purpose greenhouses are usually heated by heat sources. The disadvantage of this is that these heat sources are usually provided at a fixed height in the greenhouse, as a result of which the heat management in the top region of the plants is not constant, as a consequence of their growth. By means of the method according to the present invention the top region of the plants can be heated more uniformly and more efficient use is made of the radiant heat of the lamp. It is known that compared with heating by radiation, such as from a lamp or an external heat source, heating by convection is much less important in a greenhouse.

The cited range between 80 cm and 240 cm is found to be an optimum distance range in order, on the one hand, to prevent the plant starting to exhibit burning phenomena and, on the other hand, to prevent too much radiant energy being absorbed by absorption in the region between the lamp and the plants.

The continual adjustment to the height of the growing plants is necessary to make it possible to stay within the cited distance range. In this context the term "continual" does not refer to continuous upward movement of the lamp but to the regular periodic adjustment of the position of the lamp with respect to the plants. The investment required to make it possible to employ the method according to the invention in the greenhouse is found to be more than recouped by a higher plant yield. For optimum utilisation of the radiation emitted by the lamp, in a preferred embodiment the method comprises setting the distance between the lamp and the tip of the plants growing upwards between 120 cm and 210 cm.

In another preferred embodiment setting of the distance between the lamp and the tip of the plants growing upwards is dependent on the temperature and/or the atmospheric humidity recorded in the greenhouse. The temperature and atmospheric humidity in the greenhouse are both important parameters for the degree of heat transfer by radiation from the lamp. As previously pointed out, some of the radiated heat is absorbed by the moisture in the greenhouse. Preferably, with this arrangement, on the one hand, the distance between the lamp and the top of the plants is increased when a rise in the temperature in the greenhouse is recorded and/or when a fall in the atmospheric humidity in the greenhouse is recorded. On the other hand, the distance between the lamp and the top of the plants is reduced when a fall in the temperature in the greenhouse is recorded and/or when a rise in the atmospheric humidity in the greenhouse is recorded.

The invention furthermore relates to a greenhouse, containing plants and an installation for illuminating plants, wherein the installation comprises a lamp, lifting gear for moving the lamp in the height direction relative to the plants and control means for measuring and/or setting the distance (L) between the lamp and the tip of the plants growing upwards, wherein a heating tube is provided for heating the greenhouse, wherein the lifting gear moves the heating tube in the height direction relative to the plants. The method described above can, for example, advantageously be carried out using this greenhouse, but, if desired, it is, of course, also possible to determine an average distance between lamp and plants for an optimum heat transfer during the growth of the plants once and then to set this distance.

Preferably the control means comprise a sensor, which, for example, is equipped to determine the climatological conditions in the greenhouse.

In a preferred embodiment of the greenhouse the sensor measures the temperature and/or the atmospheric humidity in the greenhouse in order to set the distance between the lamp and the top of the plants. As already mentioned above, these parameters are extremely important when determining the ideal distance for optimum heat transfer.

In a preferred embodiment the lamp comprises a gas discharge lamp, the series (ballast) unit for which is provided below the lamp some distance from the latter. Gas discharge lamps are widely used in greenhouse horticulture because of the favourable light spectrum that such lamps emit for the growth of the plants. The advantage of positioning the series unit below he lamp some distance from the latter is that the undesirable shadows cast by this unit in incident sunlight is reduced. With this arrangement the series unit is preferably fixed to a first section that is provided at a fixed height in the greenhouse. The advantage here is that the lifting gear can be made more lightweight because this installation in any event does not have to be used to move the relatively heavy series unit.

According to the invention a heating tube is provided for heating the greenhouse, the lifting gear moving the heating tube in the height direction relative to the plants. The advantage of providing a heating tube is that the heat transfer to the plants can be better adjusted, it being possible for this heat transfer to remain constant over time, at least to the top region of the plants, by moving the heating tube upwards as the plants grow. Preferably the lamp and the heating tube are fixed to a second section that is coupled to the lifting gear, so that movement of the lamp and the heating tube can be carried out with one and the same installation.

The invention furthermore relates to an installation for illuminating plants which is used in the greenhouse described above.

The invention will be explained in more detail below on the basis of the description of preferred embodiments of the invention with reference to the appended drawings.

DESCRIPTION OF A PREFERRED EMBODIMENT

Figure 1:
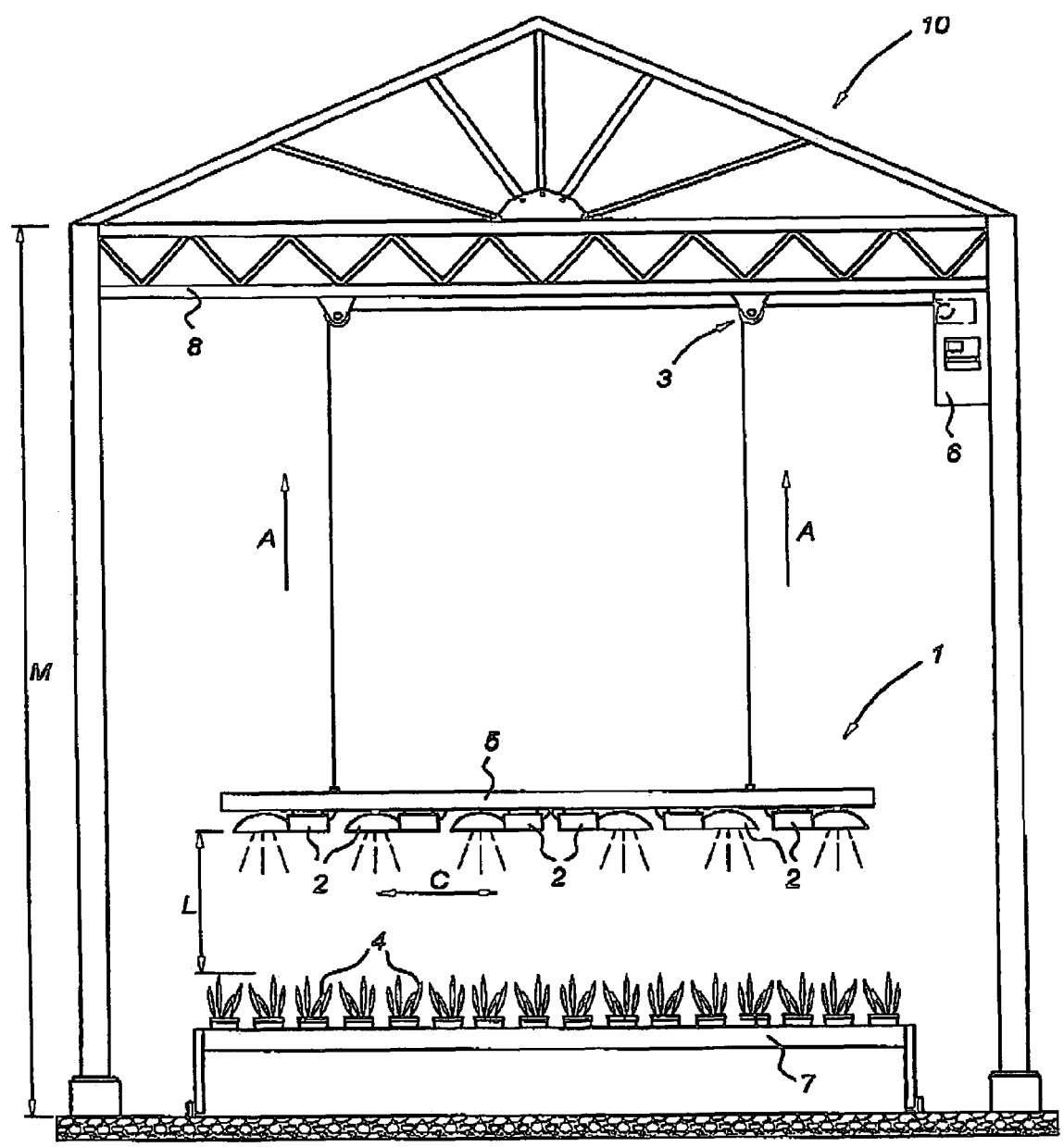
FIG. 1 shows, diagrammatically, a side view of a greenhouse according to the invention.

An installation 1 for illuminating plants in a greenhouse 10 can be seen in FIG. 1, where a number of lamps 2, which are fixed to a fixing rail 5, are moved in the height direction with respect to plants 4 by means of lifting gear 3. The lifting gear 3 is preferably fixed to a span 8 of the greenhouse 10 or, for example, to one of the roof trusses. In practice several lamps will be provided on several fixing rails that are moved by means of several lifting gears. On the other hand, it is also conceivable to couple a single lamp to lifting gear.

The distance L between the lamp 2 and the top of the plants (4) is preferably between 80 cm and 240 cm and even more preferentially between 120 cm and 210 cm. This distance is small compared with the height of the greenhouse M. This distance is kept essentially constant as the plants 4 grow by moving the lamps 2 in the direction A with the lifting gear 3. As a result less radiant heat will be lost by absorption in space between the lamp and the plants, compared with the situation where the lamps are mounted at a fixed height directly on the roof of the greenhouse. Preferably the lamps 2 will be moved and the plants 4, which are grow on a cultivation stage or cultivation bed 7, are provided at a fixed height in the greenhouse. However, it is also conceivable to mount the lamps at a fixed height, it being possible for the lifting gear 3 to move the plants 4 in the height direction.

Control means 6 are provided for controlling the lifting gear 3. In practice the distance between the lamps and the tip of the plants growing upwards will be measured regularly and periodically, such as measurement of this distance by hand. This distance will then be re-set by means of the control means and the lifting gear in order to remain within the desired range. Furthermore, the control means 6 are preferably suitable to allow measurement of the temperature and the humidity, such as the relative humidity in the greenhouse. Usually this will be effected by means of one or more sensors. Depending on the measured values for the temperature and the humidity, an optimum distance L will be determined, which is then set by means of the control means 6 and the lifting gear 3.

The installation can be used both for plants and for fruit-bearing crops. In this case it has been found that the installation is suitable in particular for the cultivation of peppers because, in comparison with other types of plant, this type of plant takes a relatively long time to reach the final growth length. This crop will thus benefit for longer from the increased heat transfer by radiation in the preceding growth stage.

Figure 2:
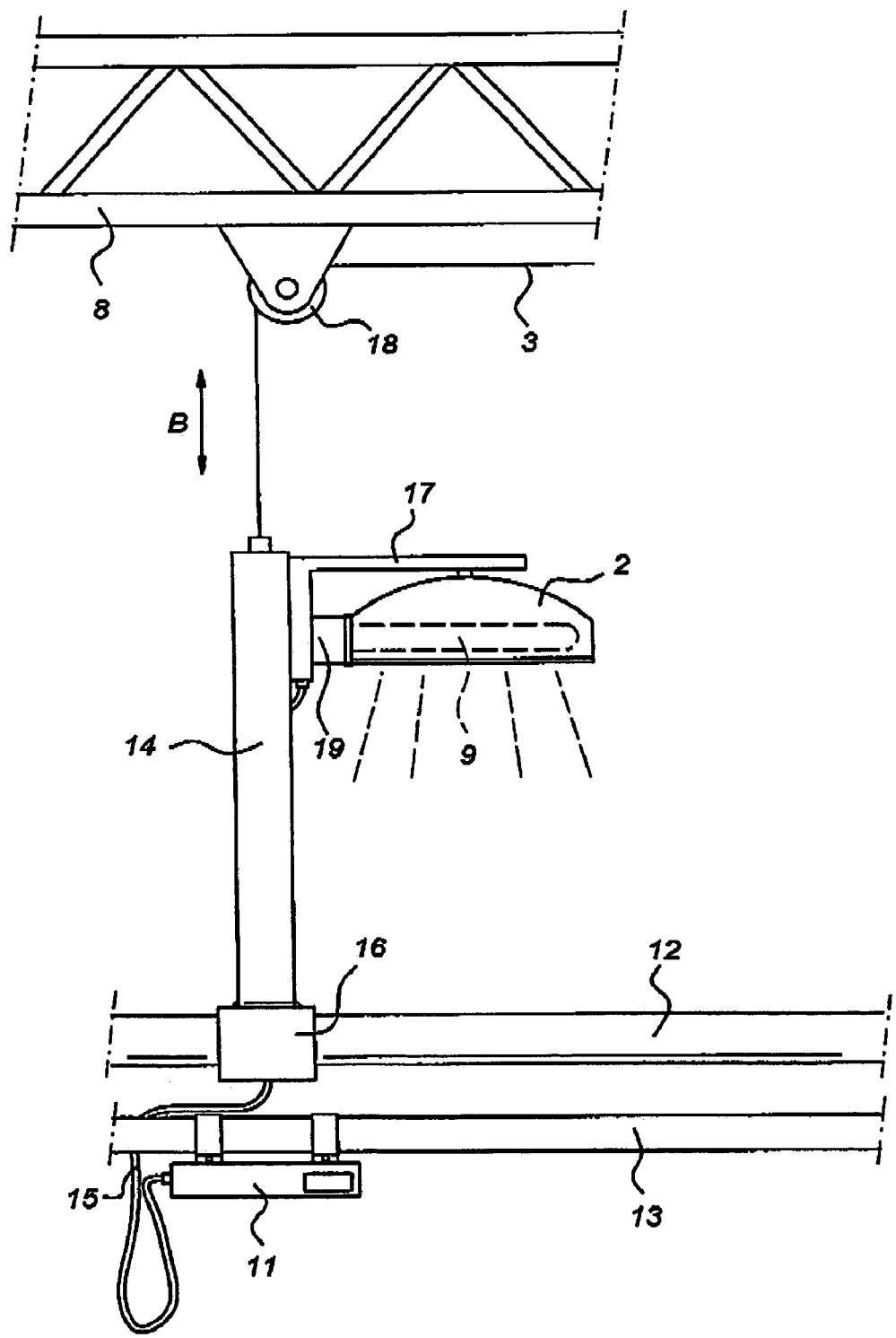
FIG. 2 shows, diagrammatically, a detail view of an installation for the illumination of plants in the greenhouse according to the invention.

FIG. 2 shows a detail of an installation for lighting plants in a greenhouse, where the lamp 2 is provided in a L-shaped bracket 17 with a lamp holder 19 which is fixed to a second section 14, such as an aluminium extruded section. The second section 14 is coupled to the lifting gear 3 and can be moved in the height direction, which is indicated by the double-headed arrow B. Although not shown in FIG. 2, it is also possible to attach the second profile 14 to the fixing rails 5 from FIG. 1 instead of to the lifting gear 3.

The lamp 2 preferably comprises a gas discharge lamp 9, which is indicated by broken lines and is usually provided in a reflector. The gas discharge lamp 9 has a power of, for example, 400 W, 600 W or 1000 W. Such lamps have proved very suitable for use in greenhouse horticulture.

An embodiment where the lamps are provided on a mobile installation which can move the lamps over the plants in the horizontal direction as well (indicated by double-headed arrow C) is not shown.

In this case the lamps can be fixed, for example, to a travelling section that can move back and forth in the fixing rails.

With such a preferred embodiment the distance between the lamp and he tip of the plants growing upwards is preferably between 120 and 210 cm. In this case the lamps can in general be suspended somewhat lower because the plants will exhibit burning phenomena less rapidly because the lamps are moving.

In the preferred embodiment in FIG. 2 the series unit 11 that controls the gas discharge lamp 9 is provided below the lamp, some distance away from the latter. In this embodiment the series unit 11 is joined to a first section 13, which is preferably provided at a fixed height in the greenhouse.

FIG. 2 furthermore shows a heating tube 12, which is connected to the second section 14 via a fixing element 16. As a result of this coupling, the heating tube 12 can be moved in the height direction B simultaneously with the lamp 2.

The ballast unit 11 is electrically connected to the lamp 2 by means of a cable 15 which has a loop in connection with moving the second section 14 upward. With this arrangement the major part of the cable 15 preferably runs through the second section 14.

The lifting gear 3 comprises a lifting line that runs over a pulley 18, the lifting line preferably being wound up on and unwound from a drum (not shown) controlled by an electric motor.

The embodiment shown in the figures and the explanation given above merely constitute a preferred embodiment of the invention.

In this context various modifications or combinations of the cited characteristics will be conceivable to a person skilled in the art; such modifications or combinations fall within the scope of the present published invention, as determined by the appended claims.

The invention claimed is:

1. A method for illuminating and heating plants in a greenhouse, the method comprising:
   (a) illuminating the plants with one or more lamps positioned above the plants;
   (b) moving the one or more lamps upwardly as the plants grow to maintain the height between the one or more lamps and the tips of the growing plants between 80 cm and 240 cm;
   (c) heating the greenhouse with a heat source supplemental to the one or more lamps; and
   (d) moving the supplemental heating tube and the one or more lamps upwardly as the plants grow using lifting gear;
   wherein the lamp and the heating tube are fixed to a support section that is coupled to the lifting gear.

2. A method according to claim 1, comprising keeping the distance between the lamp and the tips of the growing plants between 120 cm and 210 cm.

3. A method according to claim 1, comprising setting the distance between the one or more lamps and the top of the plants depending on the temperature and/or the atmospheric humidity in the greenhouse.

4. A method according to claim 3, comprising increasing the distance between the one or more lamps and the tops of the plants in response to a rise in temperature in the greenhouse and/or in response to a fall in the atmospheric humidity in the greenhouse and reducing the distance between the one or more lamps and the tops of the plants in response to a fall in temperature in the greenhouse and/or in response to a rise in the atmospheric humidity in the greenhouse.

5. A method according to claim 1 comprising moving the heat source together with the one or more lamps.

6. A method according to claim 1 wherein the heat source is located between the plants.

7. A greenhouse for plants comprising an installation for illuminating and heating the plants, the installation comprising:
   (a) one or more lamps disposed to illuminate the plants from above, the one or more lamps being movable upwardly relatively to the plants as the plants grow;
   (b) a heating tube supplemental to the one or more lamps and movable upwardly relatively to the plants as the plants; and
   (c) lifting gear to move the one or more lamps and the heating tube upwardly as the plants grow;
   wherein the lamp and the heating tube are fixed to a support section that is coupled to the lifting gear.

8. A greenhouse according to claim 7 comprising a control means for measuring and/or setting the distance between the one or more lamps and the tips of the upwardly growing plants.

9. A greenhouse according to claim 8, wherein the control means comprise a sensor.

10. A greenhouse according to claim 9, wherein the sensor measures the temperature and/or the atmospheric humidity in the greenhouse in order to set the distance between the lamp and the upwardly growing tips of the plants.

11. An installation for illuminating and heating plants intended for use in a green house, the installation comprising:
    (a) one or more lamps;
    (b) lifting gear for moving the one or more lamps upwardly relatively to the plants;
    (c) control means for measuring and/or setting the distance between the lamp and the tips of the upwardly growing plants; and
    (d) a heating tube supplemental to the one or more lamps for heating the greenhouse, the heating tube being movable upwardly by the lifting gear relatively to the plant;
    wherein the lamp and the heating tube are fixed to a support section that is coupled to the lifting gear.

* * * * *